US00RE50342E

(19) United States
(12) Reissued Patent
Yoneda et al.

(10) Patent Number: US RE50,342 E
(45) **Date of Reissued Patent: *Mar. 18, 2025**

(54) LAMINATION INDUCTOR

(71) Applicant: MURATA MANUFACTURING CO., LTD., Kyoto-fu (JP)

(72) Inventors: Masayuki Yoneda, Nagaokakyo (JP); Keiichi Yoshinaka, Nagaokakyo (JP)

(73) Assignee: Murata Manufacturing CO., Ltd.

( * ) Notice: This patent is subject to a terminal disclaimer.

(21) Appl. No.: 17/233,321

(22) Filed: Apr. 16, 2021

Related U.S. Patent Documents

Reissue of:
(64) Patent No.: 10,269,482
Issued: Apr. 23, 2019
Appl. No.: 15/284,869
Filed: Oct. 4, 2016

(30) Foreign Application Priority Data

Oct. 7, 2015 (JP) ..... 2015-199150
May 31, 2016 (JP) ..... 2016-108037

(51) Int. Cl.
*H01F 27/29* (2006.01)
*H01F 17/00* (2006.01)

(52) U.S. Cl.
CPC ..... *H01F 27/292* (2013.01); *H01F 17/0013* (2013.01)

(58) Field of Classification Search
CPC ..... H01F 27/006; H01F 27/292; H01F 27/28; H01F 17/0013
USPC ..... 336/199, 200, 206, 222, 223, 232
See application file for complete search history.

(56) References Cited

U.S. PATENT DOCUMENTS 8,201,318 B2 * 6/2012 Yamano ..... H01F 41/041 29/842
2016/0099100 A1 * 4/2016 Park ..... H01F 17/0013 336/200
2016/0141102 A1 * 5/2016 Tseng ..... H01F 27/292 336/200
2019/0318867 A1 * 10/2019 Lee ..... H01F 5/06
2021/0043364 A1 * 2/2021 Nakashima ..... H01F 17/0013

FOREIGN PATENT DOCUMENTS

CN 103703524 A 4/2014
CN 104036918 A 9/2014
JP H09-293612 A 11/1997
JP 2002-305111 * 10/2002
JP 2010-165975 A 7/2010
(Continued)

OTHER PUBLICATIONS

Office Action issued in corresponding Japanese Patent Application No. 2016-108037, dated Dec. 18, 2018.
(Continued)

*Primary Examiner* — Kenneth Whittington
(74) *Attorney, Agent, or Firm* — Morgan, Lewis & Bockius LLP

(57) ABSTRACT

Outer terminal electrodes form exposed surfaces that extend in the form of a substantially L shape while at least part thereof are embedded in a component main-body. A loop conductor layer of the coil conductor has a lower side portion, lateral side portions, oblique side portions, and an upper side portion. The lower side portion has a length shorter than a gap between outer terminal electrodes, and is positioned within a range of the gap.

13 Claims, 4 Drawing Sheets

(56) References Cited

FOREIGN PATENT DOCUMENTS

| | | | | | |
|---|---|---|---|---|---|
| JP | 2013-153009 | A | | 8/2013 | |
| JP | 2014-175383 | A | | 9/2014 | |
| JP | 2015070122 | A | * | 4/2015 | ..... H01F 17/0013 |
| WO | WO-2014136843 | A1 | * | 9/2014 | ..... H01F 17/0013 |
| WO | WO-2022030897 | A1 | * | 2/2022 | ..... H01F 27/2804 |

OTHER PUBLICATIONS

Office Action issued in corresponding Chinese Patent Application No. 201610875586.5, dated Aug. 15, 2018.
Office Action issued in corresponding Chinese Patent Application No. 201610942640.3, dated Jan. 31, 2018.

* cited by examiner

LAMINATION INDUCTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue of U.S. Pat. No. 10,269,482, which* claims benefit of priority to Japanese Patent Application 2015-199150 filed Oct. 7, 2015, and to Japanese Patent Application No. 2016-108037 filed May 31, 2016, the entire content of which is incorporated herein by reference. *Notice: More than one reissue application has been filed for the reissue of U.S. Pat. No. 10,269,482. The reissue applications are the present application, and application Ser. No. 17/236,245 and application Ser. No. 17/237,613, which are both a continuation reissue of the present application.*

TECHNICAL FIELD

The present disclosure relates to lamination inductors, and particularly relates to a lamination inductor that has a coil conductor built-in in a lamination structure.

BACKGROUND

A lamination inductor disclosed in Japanese Unexamined Patent Application Publication No. 2010-165975 includes a component main-body having a lamination structure in which a plurality of insulator layers are laminated, and a coil conductor is provided inside the stated component main-body. The coil conductor is constituted of a plurality of loop conductor layers each extending so as to form part of a circular path along an interface between the insulator layers and a plurality of via hole conductors passing through the insulator layer in a thickness direction thereof, and has a shape that is helically extended by alternately connecting the loop conductor layers and the via hole conductors.

Electrical characteristics of such a lamination inductor are closely related to an inside diameter of the coil conductor having a helically extending shape in the component main-body, and it has been known that the Q-value can be made higher by making the inside diameter of the coil conductor larger.

Based on the above understanding, a technique proposed to provide a higher Q-value as a main purpose is disclosed in Japanese Unexamined Patent Application Publication No. 2010-165975, for example.

In a lamination inductor disclosed in Japanese Unexamined Patent Application Publication No. 2010-165975, first and second outer terminal electrodes are so formed as to extend in the form of a substantially L shape while being respectively embedded inside a component main-body. In addition, a loop conductor layer constituting a main section of a coil conductor extends with its outer edge being along not only an outer surface of the component main-body but also inner edges of the first and second outer terminal electrodes that are extended in the form of a substantially L shape. In this case, the loop conductor is made to have a shape being bent at a plurality of portions so that the loop conductor comes close to the respective inner edges of the first and second outer terminal electrodes, thereby realizing a large inside diameter of the coil conductor as much as possible.

SUMMARY

According to the lamination inductor disclosed in Japanese Unexamined Patent Application Publication No. 2010-165975, since the inside diameter of the coil conductor is made larger, a higher Q-value can be obtained. However, it has been understood that making the inside diameter of the coil conductor larger raises another problem.

That is, because an electrical potential difference is generated between the respective outer terminal electrodes and the coil conductor, generation of stray capacitance therebetween cannot be avoided. In the lamination inductor disclosed in Japanese Unexamined Patent Application Publication No. 2010-165975, in order to make the inside diameter of the coil conductor larger, the outer edge of the loop conductor layer constituting the main section of the coil conductor is made to come close to the inner edges of the respective outer terminal electrodes. Because of this, a relatively large stray capacitance is generated between the respective outer terminal electrodes and the coil conductor.

This stray capacitance causes a self-resonant frequency of the lamination inductor to be lowered, thereby decreasing a Q-value in a high frequency region.

Accordingly, it is an object of the present disclosure to solve the above problem and provide a lamination inductor capable of obtaining a higher Q-value.

A lamination inductor according to an embodiment of the present disclosure includes a component main-body. The component main-body is formed in a substantially rectangular parallelepiped shape having an upper surface and a lower surface opposing each other, first and second side surfaces opposing each other and connecting the upper surface and the lower surface, and first and second end surfaces opposing each other and also connecting the upper surface and the lower surface, and has a lamination structure in which a plurality of insulator layers are laminated in a direction perpendicular to the side surfaces.

A coil conductor is disposed inside the component main-body. The coil conductor is constituted of a plurality of loop conductor layers each extending so as to form part of a circular path along an interface between the insulator layers and a plurality of via hole conductors passing through the insulator layer in a thickness direction thereof, and has a shape that is helically extended by alternately connecting the loop conductors and the via hole conductors.

First and second outer terminal electrodes are electrically connected to one end and the other end of the coil conductor, respectively.

First and second extended conductor layers are formed along an interface between the insulator layers and connect the one and other ends of the coil conductor with the first and second outer terminal electrodes, respectively.

The first outer terminal electrode is so provided as to form an exposed surface that extends in the form of a substantially L shape from a lower half portion of the first end surface to a midway portion of the lower surface in a state where at least part of the first outer terminal electrode is embedded in the component main-body. The second outer terminal electrode is so provided as to form an exposed surface that extends in the form of a substantially L shape from a lower half portion of the second end surface to a midway portion of the lower surface while leaving a gap from the first outer terminal electrode on the lower surface in a state where at least part of the second outer terminal electrode is embedded in the component main-body.

The loop conductor layer includes a lower side portion extending along the lower surface; first and second lateral side portions extending along an upper half portion of the first end surface and an upper half portion of the second end surface, respectively; a first oblique side portion connecting an end portion of the lower side portion on the first end surface side and a lower end portion of the first lateral side portion in an oblique direction relative to the lower surface; and a second oblique side portion connecting an end portion of the lower side portion on the second end surface side and a lower end portion of the second lateral side portion in an oblique direction relative to the lower surface.

The lower side portion has a length shorter than the gap and is positioned within a range of the gap.

As discussed above, in the embodiment of the present disclosure, an appropriate size of each interval formed between the outer terminal electrodes and the loop conductor layer, which has an influence on the magnitude of stray capacitance, is secured with the shapes of the first and second oblique side portions and the position of the lower side portion, whereby it is attempted to suppress the stray capacitance generated between the outer terminal electrodes and the loop conductor layer to be small.

In an embodiment of the present disclosure, it is preferable that both a length A1 of a perpendicular line drawn from a substantially L-shaped internal corner portion of the first outer terminal electrode to an outer edge of the first oblique side portion and a length A2 of a perpendicular line drawn from a substantially L-shaped internal corner portion of the second outer terminal electrode to an outer edge of the second oblique side portion, be equal to or larger than approximately 80 μm.

Further, in an embodiment of the present disclosure, it is preferable that both a length B1 of a perpendicular line drawn from a first nearest portion, that is the nearest portion to the first oblique side portion in an extending section along the lower surface of the first outer terminal electrode, to the outer edge of the first oblique side portion, and a length B2 of a perpendicular line drawn from a second nearest portion, that is the nearest portion to the second oblique side portion in an extending section along the lower surface of the second outer terminal electrode, to the outer edge of the second oblique side portion are no less than approximately 10 μm and no more than approximately 50 μm.

As in the above preferred embodiments of the disclosure, with regard to some dimension values that define the sizes of intervals formed between the outer terminal electrodes and the loop conductor layer, which have an influence on the magnitude of stray capacitance, the conditions under which the stray capacitance can be more surely suppressed to be small or the inside diameter of the coil conductor can be secured to be longer without some risk are provided. Therefore, advantageous design guidelines can be given for the design of the lamination inductor.

In an embodiment of the present disclosure, it is preferable that the length A1 and the length A2 be equal to each other and/or that the length B1 and the length B2 be equal to each other. This configuration makes it possible to remove directivity for the mounting of the lamination inductor.

With the lamination inductor according to the embodiments of the present disclosure, as discussed above, because stray capacitance generated between the outer terminal electrodes and the loop conductor layer can be suppressed to be small, stray capacitance that can be generated in the overall lamination inductor can be suppressed to be small, whereby the self-resonant frequency can be increased. As a result, the Q-value in a high frequency region can be raised.

Other features, elements, characteristics and advantages of the present disclosure will become more apparent from the following detailed description of the present disclosure with reference to the attached drawings.

DETAILED DESCRIPTION

Figure 1:
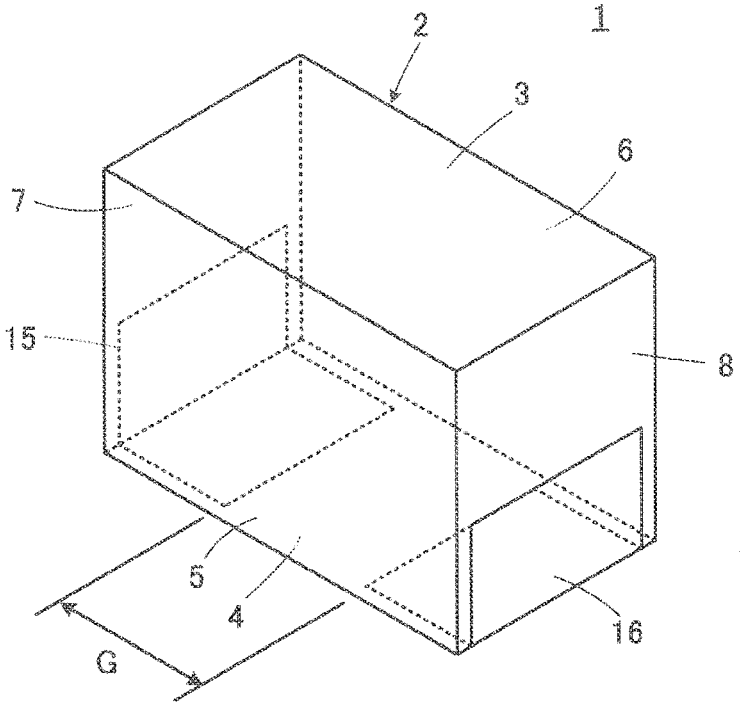
FIG. 1 is a perspective view illustrating an external appearance of a lamination inductor 1 according to an embodiment of the present disclosure.

As shown in FIG. 1, a lamination inductor 1 according to an embodiment of the present disclosure includes a component main-body 2. The component main-body 2 is formed in a substantially rectangular parallelepiped shape having an upper surface 3 and a lower surface 4 opposing each other, first and second side surfaces 5 and 6 opposing each other and connecting the upper surface 3 and the lower surface 4, and first and second end surfaces 7 and 8 opposing each other and also connecting the upper surface 3 and the lower surface 4.

The component main-body 2 has a lamination structure in which a plurality of insulator layers 9A through 9F are laminated. These insulator layers 9A through 9F are laminated in a direction perpendicular to the side surfaces 5 and 6 (see FIG. 1). As can be understood from a structure in which, among the insulator layers 9A through 9F, the insulator layers 9A and 9F positioned at both ends thereof are thicker in thickness than the other insulator layers 9B through 9E, the component main-body 2 is illustrated as a multilayer body formed of a plurality of insulator layers.

Inside the component main-body 2, disposed is a coil conductor 12 that is helically extended by alternately connecting a plurality of loop conductor layers 10A through 10E each extending so as to form part of a circular path along one of interfaces formed among the insulator layers 9A through 9F and a plurality of via hole conductors 11A through 11D each passing through one of the insulator layers 9B through 9E in a thickness direction thereof. Further, the loop conductor layers 10A through 10E have relatively wide via pads 13A through 13H formed at portions for connection with the via hole conductors 11A through 11D.

To be more specific, the coil conductor 12 is constituted of the loop conductor layer 10A, the via hole conductor 11A, the loop conductor layer 10B, the via hole conductor 11B, the loop conductor layer 10C, the via hole conductor 11C, the loop conductor layer 10D, the via hole conductor 11D, and the loop conductor layer 10E that are connected to each other in this sequence.

The via hole conductor 11A is connected to the loop conductor layer 10A through the via pad 13A, and is connected to the loop conductor layer 10B through the via pad 13B.

Next, the via hole conductor 11B is connected to the loop conductor layer 10B through the via pad 13C, and is connected to the loop conductor layer 10C through the via pad 13D.

Next, the via hole conductor 11C is connected to the loop conductor layer 10C through the via pad 13E, and is connected to the loop conductor layer 10D through the via pad 13F.

Subsequently, the via hole conductor 11D is connected to the loop conductor layer 10D through the via pad 13G, and is connected to the loop conductor layer 10E through the via pad 13H.

Note that the numbers of the loop conductor layers 10A through 10E and the via hole conductors 11A through 11D that are sequentially connected so as to constitute the coil conductor 12, the number of turns of the coil conductor 12, and the number of laminated layers of the insulator layers 9A through 9F are not limited to those illustrated in the drawings, and can be arbitrarily changed.

The lamination inductor 1 includes first and second outer terminal electrodes 15 and 16. As specifically shown in FIG. 1, the first outer terminal electrodes 15 is so provided as to form an exposed surface that extends in the form of a substantially L shape from a lower half portion of the first end surface 7 to a midway portion of the lower surface 4. The second outer terminal electrode 16 is so provided as to form an exposed surface that extends in the form of a substantially L shape from a lower half portion of the second end surface 8 to a midway portion of the lower surface 4 while leaving a gap with a predetermined length from the first outer terminal electrode 15 on the lower surface 4. In the present embodiment, the outer terminal electrodes 15 and 16, except the above-mentioned exposed surfaces, are respectively embedded in the component main-body 2.

A first extended conductor layer 17 integrally extended from the loop conductor layer 10A that is provided along an interface between the insulator layers 9A and 9B, is connected to the first outer terminal electrode 15. Meanwhile, a second extended conductor layer 18 integrally extended from the loop conductor layer 10E that is provided along an interface between the insulator layers 9E and 9F, is connected to the second outer terminal electrode 16. In this manner, the first extended conductor layer 17 connects one end of the coil conductor 12 with the outer terminal electrode 15, while the second extended conductor layer 18 connects the other end of the coil conductor 12 with the second outer electrode 16.

When the lamination inductor 1 is mounted on a circuit board (not shown), the lower surface 4 is taken as a mounting surface that faces the circuit board. Accordingly, the direction of magnetic flux given by the coil conductor 12 is parallel to the mounting surface.

The lamination inductor 1 is preferably manufactured as follows.

Basically, the following techniques are applied in the manufacture of the lamination inductor 1: a technique in which a plurality of insulator paste layers to become the insulator layers 9A through 9F are formed by applying a photosensitive insulator paste whose main ingredient is borosilicate glass, for example, on a carrier film by printing; a technique in which wiring conductors such as the loop conductor layers 10A through 10E or the like are formed in the specific insulator paste layers by using a photosensitive conductive paste whose main ingredient is Ag, for example; a technique in which holes or grooves for disposing the via hole conductors 11A through 11D or the outer terminal electrodes 15, 16 are formed in the specific insulator paste layers; and a technique in which the plurality of insulator paste layers are laminated, cut in a predetermined size, and thereafter calcined.

Figure 2:
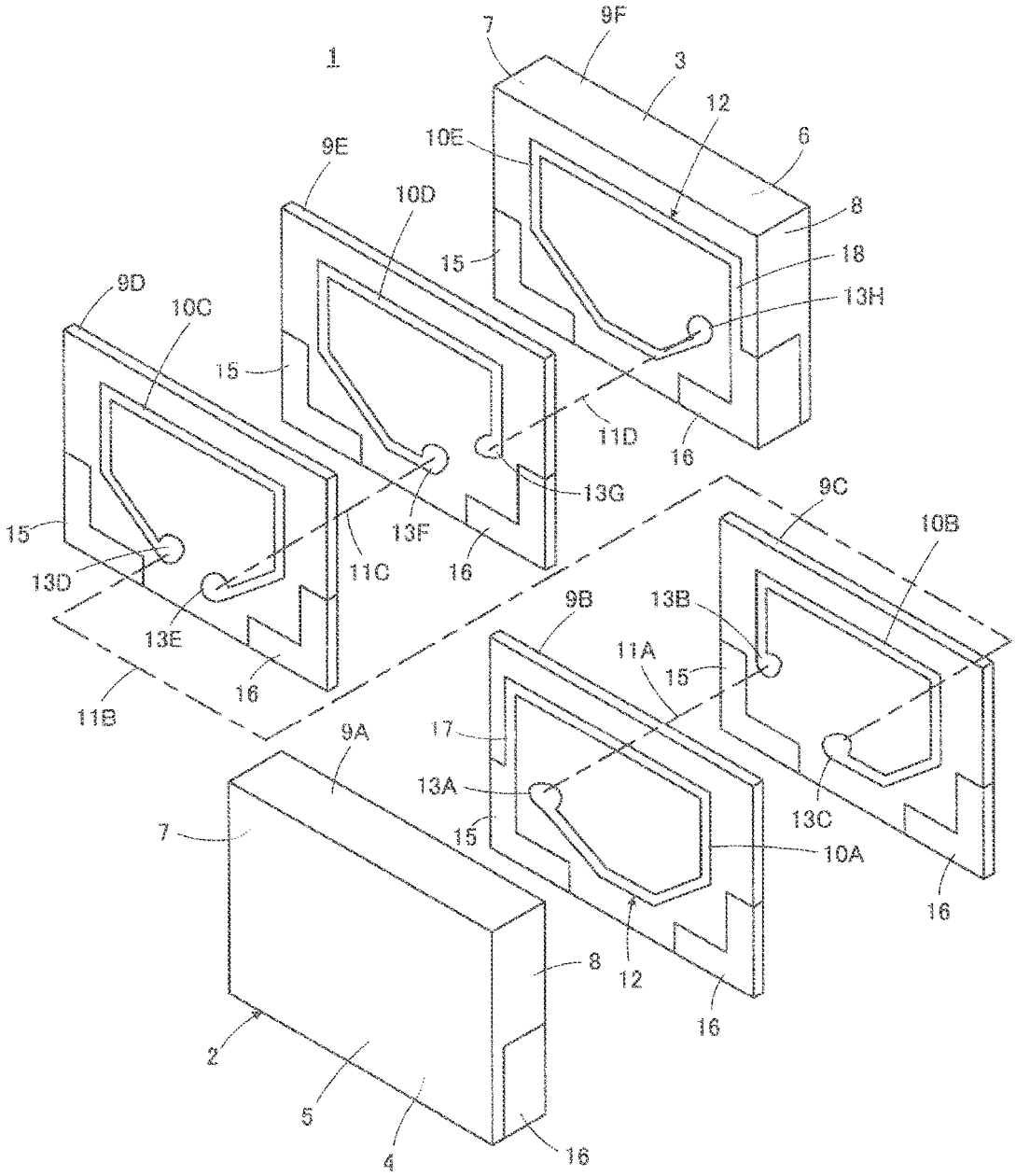
FIG. 2 is an exploded perspective view of the lamination inductor 1 shown in FIG. 1.

1. In order to make the insulator layer 9A as shown in FIG. 2, printing with the photosensitive insulator paste is repeated on the carrier film. With this, a photosensitive insulator paste layer made of multiple layers is formed.

The entire surface of the photosensitive insulator paste layer which is part of the insulator layer 9A and is to become the insulator layer to serve as the outermost layer, is exposed to ultraviolet rays. It is preferable that the obtained insulator layer to serve as the outermost layer be colored with a different color from the other insulator layers in order to make it easy to detect an unfavorable case such as rolling or the like at the time of mounting the lamination inductor 1.

Further, in the photosensitive insulator paste layer which is a remaining part of the insulator layer 9A and is to become the insulator layer to form the outer terminal electrodes 15 and 16 therein, a photolithography technique is applied so as to form the grooves for disposing the outer terminal electrodes 15 and 16 therein, and the grooves are filled with the photosensitive conductive paste.

2. In order to make the insulator layers 9B through 9E as shown in FIG. 2, respective photosensitive insulator paste layers to become the insulator layers 9B through 9E are formed on the carrier film, and the holes for disposing the via hole conductors 11A through 11D as well as the grooves for disposing the outer terminal electrodes 15 and 16 are formed in the photosensitive insulator paste layers by applying the photolithography technique.

Next, a photosensitive conductive paste layer is applied to the photosensitive insulator paste layers by printing. At this time, the photosensitive conductive paste is filled into the holes for disposing the via hole conductors 11A through 11D and the grooves for disposing outer terminal electrodes 15 and 16. Subsequently, the photolithography technique is applied to the photosensitive conductive paste layers to carry out patterning so as to obtain the loop conductor layers 10A through 10D having the via pads 13A through 13G.

3. In order to make the insulator layer 9F as shown in FIG. 2, printing with the photosensitive insulator paste is repeated on the carrier film. With this, a photosensitive insulator paste layer made of multiple layers is formed.

Like in the case of the insulator layer 9A, the entire surface of the photosensitive insulator paste layer which is part of the insulator layer 9F and is to become the insulator layer to serve as the outermost layer, is exposed to ultraviolet rays. In addition, it is preferable that the insulator layer to serve as the outermost layer be colored with a different color from the other insulator layers.

Further, in the photosensitive insulator paste layer, which is a remaining part of the insulator layer 9F and is to become the insulator layer to form only the outer terminal electrodes 15 and 16 therein, the photolithography technique is applied so as to form the grooves for disposing the outer terminal electrodes 15 and 16, and the grooves are filled with the photosensitive conductive paste.

In the photosensitive insulator paste layer in which the outer terminal electrodes 15, 16 and the loop conductor layer 10E including the via pad 13H are to be formed, the photolithography technique is applied to the stated photosensitive insulator paste layer so as to form the grooves for disposing the outer terminal electrodes 15 and 16, first. Next, the photosensitive conductive paste layer is applied onto the photosensitive insulator paste layer by printing. At this time, the photosensitive conductive paste is filled into the grooves for disposing the outer terminal electrodes 15 and 16. Subsequently, the photolithography technique is applied to the above photosensitive conductive paste layer to carry out patterning so as to obtain the loop conductor layer 10E including the via pad 13H.

4. Next, the above-mentioned photosensitive insulator paste layers are laminated in sequence so that the insulator layers 9A through 9F are laminated in the order as shown in FIG. 2, thereby obtaining a mother multilayer body.

5. The mother multilayer body is cut with a dicing machine, a press-cutter, or the like so that a plurality of component main-bodies before calcination are obtained. The outer terminal electrodes 15 and 16 are each exposed to a cut surface obtained by the above cutting.

6. The component main-body before calcination is calcined under predetermined conditions, whereby the component main-body 2 is obtained. The component main-body 2 is contracted through the calcination. Barrel polishing, for example, is carried out on the component main-body 2.

7. A plating film is formed, as needed, on the portions of the outer terminal electrodes 15 and 16 that are exposed from the component main-body 2. The plating film is formed of a Ni or Cu plating layer and a Sn plating layer formed on the stated Ni or Cu plating layer.

8. In the manner described above, the lamination inductor 1 is completed.

Figure 3:
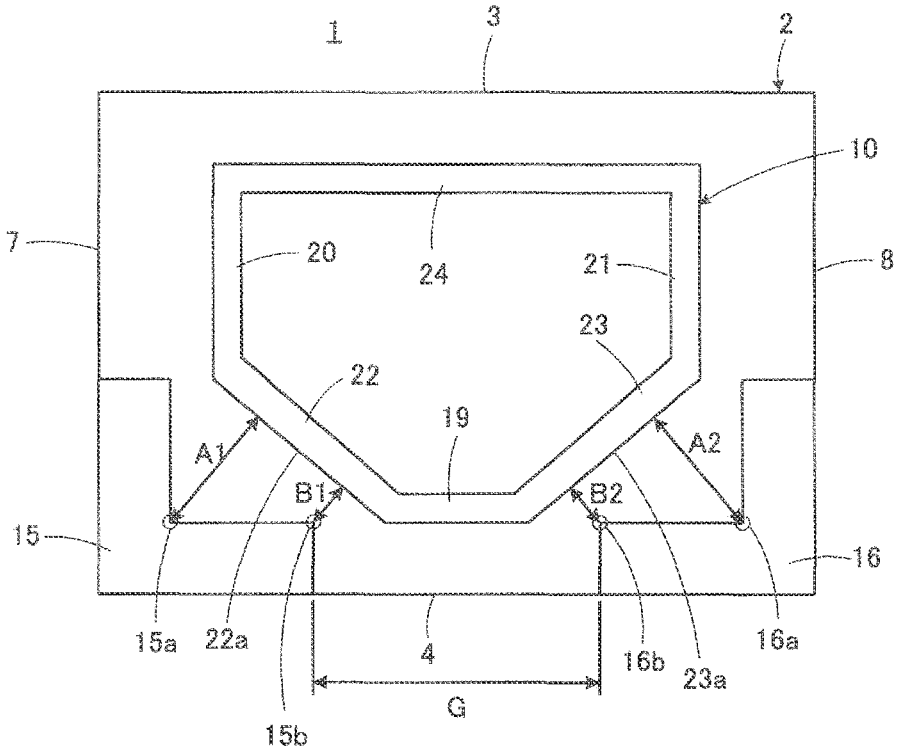
FIG. 3 is a diagram schematically illustrating the lamination inductor 1 shown in FIG. 1 when the lamination inductor 1 is viewed in a central axis line direction of a coil conductor in a see-through manner.

A configuration of the lamination inductor 1 as a feature of the present embodiment is as follows. That is, the configuration as a feature of the embodiment will be described mainly referring to FIG. 3. FIG. 3 is a diagram schematically illustrating the lamination inductor 1 when viewed in a central axis line direction of the coil conductor 12 in a see-through manner. In FIG. 3, only the first and second outer terminal electrodes 15 and 16, and the loop conductor layers 10A through 10E of the coil conductor 12 are illustrated, while the via hole conductors 11A through 11D and the via pads 13A through 13H are not illustrated. Note that in FIG. 3, the loop conductor layers 10A through 10E overlapping with each other are collectively indicated by a reference sign of "10".

As shown in FIG. 3, the loop conductor layer 10 included in the lamination inductor 1 is formed in a substantially hexagonal shape including a lower side portion 19, first and second lateral side portions 20 and 21, first and second oblique side portions 22 and 23, and an upper side portion 24.

The lower side portion 19 extends along the lower surface 4, more specifically, linearly extends in parallel to the lower surface 4. Further, the lower side portion 19 has a length shorter than the gap G, and is positioned within a range of the gap G.

The first lateral side surface portion 20 and the second lateral side portion 21 extend along an upper half portion of the first end surface 7 and an upper half portion of the second end surface 8, respectively. More specifically, the first and second lateral side portions 20 and 21 linearly extend in parallel to upper half portions of the first and second end surfaces 7 and 8, respectively.

The first oblique side portion 22 connects an end portion of the lower side portion 19 on the first end surface 7 side and a lower end portion of the first lateral side portion in an oblique direction relative to the lower surface 4, while the second oblique side portion 23 connects an end portion of the lower side portion 19 on the second end surface side and a lower end portion of the second lateral side portion 21 in an oblique direction relative to the lower surface 4.

As discussed above, the first and second oblique side portions 22 and 23 of the loop conductor layer 10 in the lamination inductor 1 do not have shapes bending along inner edges of the substantially L-shaped first and second outer terminal electrodes 15 and 16. Further, because the loop conductor layer 10 includes the lower side portion 19 present at the position as mentioned before, the first and second oblique side portions 22 and 23 are formed in the shapes being distanced from the outer terminal electrodes 15 and 16, respectively, on the lower surface 4 side. In the embodiment illustrated, as can be understood from the configuration in which the first and second oblique side portions 22 and 23 shown in FIG. 3, are each formed in a linearly extending shape, the first oblique side portion 22 and second oblique side portion 23 have the shapes connecting the end portions of the lower side portion 19 on the end surface 7 side and end surface 8 side to the lower end portions of the lateral side portions 20 and 21 at the shortest distance, respectively.

The upper side portion 24 extends along the upper surface 3, more specifically, linearly extends in parallel to the upper surface 3.

Since the upper side portion 24 is relatively distanced from the first and second outer terminal electrodes 15 and 16 regarding a positional relationship therebetween, the upper side portion 24 has an insignificant influence on the aforementioned stray capacitance problem. Accordingly, the shape of the upper side portion 24 can be arbitrarily determined, and the upper side portion 24 is not necessarily required to linearly extend in parallel to the upper surface 3.

It is preferable that both a length A1 of a perpendicular line drawn from a substantially L-shaped internal corner portion 15a of the first outer terminal electrode 15 to an outer edge 22a of the first oblique side portion 22 and a length A2 of a perpendicular line drawn from a substantially L-shaped internal corner portion 16a of the second outer terminal electrode 16 to an outer edge 23a of the second oblique side portion 23, be equal to or larger than approximately 80 μm. According to the lamination inductor 1 in which the lengths A1 and A2 are secured to be no less than a predetermined length as discussed above, stray capacitance generated between the outer terminal electrodes 15, 16 and the loop conductor layer 10 can be more surely suppressed to be small, as will be described later.

Further, both a length B1 of a perpendicular line drawn from a first nearest portion 15b, that is the nearest portion to the first oblique side portion 22 in an extending section along the lower surface 4 of the first outer terminal electrode 15, to the outer edge 22a of the first oblique side portion 22 and a length B2 of a perpendicular line drawn from a second nearest portion 16b, that is the nearest portion to the second oblique side portion 23 in an extending section along the lower surface 4 of the second outer terminal electrode 16, to the outer edge 23a of the second oblique side portion 23 are no less than approximately 10 μm and no more than approximately 50 μm. According to the lamination inductor 1 in which the lengths B1 and B2 are no more than a predetermined size as discussed above, the inside diameter of the coil conductor 12 can be secured to be longer. The length B1 and the length B2 are shorter than the lengths A1 and A2 in FIG. 3.

Although there is an advantage that the inside diameter of the coil conductor 12 can be secured to be longer as the lengths B1 and B2 are shorter, there arises a high risk that, if the lengths B1 and B2 are excessively short, a signal is caused to pass through between the loop conductor layer 10 (10A through 10E) and the outer terminal electrodes 15 and 16 at a high frequency, thereby consequently causing a short-circuit failure. In addition, in the case where conductive powder contained in the photosensitive conductive paste used for forming the outer terminal electrodes 15, 16 and the loop conductor layers has not been sufficiently removed by the photolithography method in the aforementioned manufacturing method, a short-circuit failure is also caused in some case if the lengths B1 and B2 are excessively short. To reduce these failures, it is preferable that the lengths B1 and B2 are secured to be no less than 10 μm.

In the embodiment illustrated, as can be understood from the drawing of FIG. 3 having a geometric shape of bilateral symmetry, the lengths A1 and A2 are equal to each other and the lengths B1 and B2 are also equal to each other.

In the case where the internal corner portions 15a and 16a of the outer terminal electrodes 15 and 16, respectively serving as starting points of the lengths A1 and A2, are made to be curved, the starting points are respectively positioned on the curved portions of the internal corner portions. Further, in the case where the end portions 15b and 16b of the outer terminal electrodes 15 and 16, respectively serving as starting points of the lengths B1 and B2, are made to be curved, the starting points are respectively positioned on the curved portions of the end portions.

Further, the loop conductor layer included in the lamination inductor may have a shape that extends more than one turn in a spiral form at a single interface between the insulator layers. In this case, the outer edges 22a and 23a of the oblique side portions 22 and 23, serving as ending points of the lengths A1 and A2 as well as the lengths B1 and B2, are defined by the outer edges of the loop conductor layer positioned in the outermost side portion.

According to the lamination inductor 1 having the above-described dimension conditions, it was understood from a simulation result, which will be explained later, that the stray capacitance generated between the outer terminal electrodes 15, 16 and the loop conductor layer 10 (10A through 10E) can be suppressed to be small. As such, stray capacitance that can be generated in the overall lamination inductor 1 can be suppressed to be small, whereby the self-resonant frequency can be increased and consequently the Q-value in a high frequency range can be raised.

The following simulation was carried out.

As for a lamination inductor equipped with a coil conductor in a structure of 16 layers and 21 turns, that is, a coil conductor including loop conductor layers each having a shape extending more than one turn in a spiral form at a single interface between the insulator layers, the simulation was carried out using an electromagnetic field simulator to observe a change in the self-resonant frequency when the above-mentioned length A (=A1=A2) was varied in a range from 66.2 μm to 155.2 μm, as shown in Chart 1 below. In this simulation, on the assumption that the above-mentioned length B (=B1=B2) was fixed to 10 μm, the length A was varied while making fine adjustment by an amount of a space width of the loop conductor layer having a shape that extends more than one turn in a spiral form so that a value of L became 170 nH.

Figure 4:
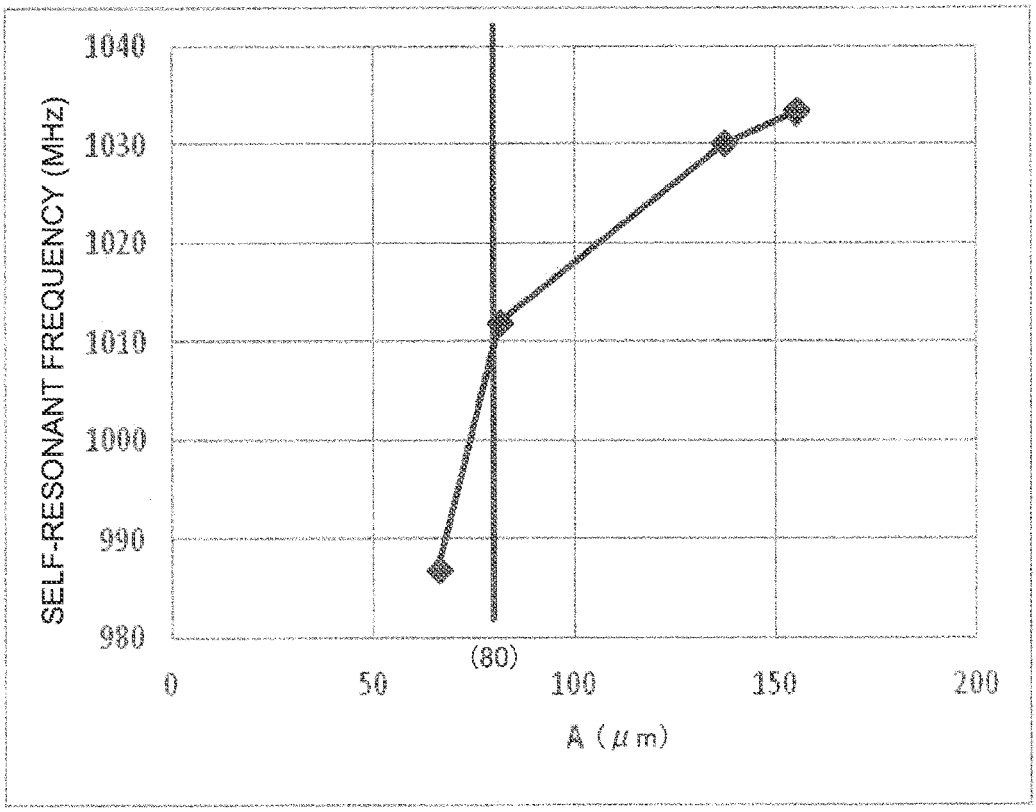
FIG. 4 is a graph indicating a result obtained by an electromagnetic field simulation to observe a change in a self-resonant frequency when a length "A" of a perpendicular line drawn from a substantially L-shaped internal corner portion of an outer terminal electrode to an outer edge of an oblique side portion of a loop conductor layer was varied.

A result obtained by the simulation is illustrated in Chart 1 and FIG. 4.

CHART 1

| Length A [μm] | Self-Resonant Frequency [MHz] |
|---|---|
| 66.2 | 987 |
| 81.6 | 1012 |
| 137.2 | 1030 |
| 155.2 | 1033 |

As can be understood from Chart 1 and FIG. 4, as the length A is longer, the self-resonant frequency becomes higher. In particular, the gradient of a graph in FIG. 4 is considerably smaller in the case where the length A is in a range of no less than 80 μm than in the case where the length is less than 80 μm, which means that an effect of improvement in the self-resonant frequency is saturated to some extent. In other words, in the case where the length A is no less than 80 μm, stray capacitance generated between the outer terminal electrodes and the loop conductor layer can be suppressed to be small and a higher self-resonant frequency is realized.

Although descriptions related to the embodiment illustrating the present disclosure have been given thus far, other types of variations can be made within the range and scope of the present disclosure. Further, the embodiment and variations described in this specification are merely examples, and between the embodiment and the variations, configurations thereof can partially replace each other or be combined as well.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A lamination inductor comprising:

a component main-body that is formed in a rectangular parallelepiped shape including an upper surface and a lower surface opposing each other, first and second side surfaces opposing each other and connecting the upper surface and the lower surface, and first and second end surfaces opposing each other and also connecting the upper surface and the lower surface, and that has a lamination structure in which a plurality of insulator layers are laminated in a direction perpendicular to the side surfaces;

a coil conductor that is disposed inside the component main-body, is constituted of a plurality of loop conductor layers each extending so as to form part of a circular path along an interface between the insulator layers and a plurality of via hole conductors passing through the insulator layers in a thickness direction of the insulator layers, and has a shape that is helically extended by alternately connecting the loop conductor layers and the via hole conductors;

first outer terminal electrode and second outer terminal electrode that are electrically connected to one end and the other end of the coil conductor, respectively; and first extended conductor layer and second extended conductor layer that are formed along an interface between the insulator layers, and connect the one end and the other end of the coil conductor with the first outer terminal electrode and second outer terminal electrode, respectively, wherein the first outer terminal electrode is so provided as to form an exposed surface that extends in an L shape form from a lower half portion of the first end surface to a midway portion of the lower surface in a state where at least part of the first outer terminal electrode is embedded in the component main-body, the second outer terminal electrode is so provided as to form an exposed surface that extends in an L shape form from a lower half portion of the second end surface to a midway portion of the lower surface while leaving a gap from the first outer terminal electrode on the lower surface in a state where at least part of the second outer terminal electrode is embedded in the component main-body, the loop conductor layer includes a lower side portion extending along the lower surface; a first lateral side portion and a second lateral side portion extending along an upper half portion of the first end surface and an upper half portion of the second end surface, respectively; a first oblique side portion connecting an end portion of the lower side portion on the first end surface side and a lower end portion of the first lateral side portion in an oblique direction relative to the lower surface; and a second oblique side portion connecting an end portion of the lower side portion on the second end surface side and a lower end portion of the second lateral side portion in an oblique direction relative to the lower surface, the lower side portion has a length shorter than the gap and is positioned within a range of the gap, and inner edges of the first and second lateral side portions do not overlap with the first and second outer terminal electrodes in a direction along the first and second end surfaces when viewed in a direction perpendicular to the first and second end surfaces and parallel to the first and second side surfaces,

*wherein both a length B1 of a perpendicular line drawn from a first nearest portion, that is the nearest portion to the first oblique side portion in an extending section along the lower surface of the first outer terminal electrode, to the outer edge of the first oblique side portion and a length B2 of a perpendicular line drawn from a second nearest portion, that is the nearest portion to the second oblique side portion in an extending section along the lower surface of the second outer terminal electrode, to the outer edge of the second oblique side portion are no less than 10 μm and no more than 50 μm.*

2. A lamination inductor comprising:

a component main-body that is formed in a rectangular parallelepiped shape including an upper surface and a lower surface opposing each other, first and second side surfaces opposing each other and connecting the upper surface and the lower surface, and first and second end surfaces opposing each other and also connecting the upper surface and the lower surface, and that has a lamination structure in which a plurality of insulator layers are laminated in a direction perpendicular to the side surfaces;

a coil conductor that is disposed inside the component main-body, is constituted of a plurality of loop conductor layers each extending so as to form part of a circular path along an interface between the insulator layers and a plurality of via hole conductors passing through the insulator layers in a thickness direction of the insulator layers, and has a shape that is helically extended by alternately connecting the loop conductor layers and the via hole conductors;

first outer terminal electrode and second outer terminal electrode that are electrically connected to one end and the other end of the coil conductor, respectively; and first extended conductor layer and second extended conductor layer that are formed along an interface between the insulator layers, and connect the one end and the other end of the coil conductor with the first outer terminal electrode and second outer terminal electrode, respectively, wherein the first outer terminal electrode is so provided as to form an exposed surface that extends in an L shape form from a lower half portion of the first end surface to a midway portion of the lower surface in a state where at least part of the first outer terminal electrode is embedded in the component main-body, the second outer terminal electrode is so provided as to form an exposed surface that extends in an L shape form from a lower half portion of the second end surface to a midway portion of the lower surface while leaving a gap from the first outer terminal electrode on the lower surface in a state where at least part of the second outer terminal electrode is embedded in the component main-body, the loop conductor layer includes a lower side portion extending along the lower surface; a first lateral side portion and a second lateral side portion extending along an upper half portion of the first end surface and an upper half portion of the second end surface, respectively; a first oblique side portion connecting an end portion of the lower side portion on the first end surface side and a lower end portion of the first lateral side portion in an oblique direction relative to the lower surface; and a second oblique side portion connecting an end portion of the lower side portion on the second end surface side and a lower end portion of the second lateral side portion in an oblique direction relative to the lower surface, and the lower side portion has a length shorter than the gap and is positioned within a range of the gap, wherein both a length A 1 of a perpendicular line drawn from an L-shaped internal corner portion of the first outer terminal electrode to an outer edge of the first oblique side portion and a length A2 of a perpendicular line drawn from an L-shaped internal corner portion of the second outer terminal electrode to an outer edge of the second oblique side portion, are equal to or larger than 80 μm.

3. The lamination inductor according to claim 2, wherein the length A1 and the length A2 are equal to each other.

4. A lamination inductor comprising:

a component main-body that is formed in a rectangular parallelepiped shape including an upper surface and a lower surface opposing each other, first and second side surfaces opposing each other and connecting the upper surface and the lower surface, and first and second end surfaces opposing each other and also connecting the upper surface and the lower surface, and that has a lamination structure in which a plurality of insulator layers are laminated in a direction perpendicular to the side surfaces;

a coil conductor that is disposed inside the component main-body, is constituted of a plurality of loop conductor layers each extending so as to form part of a circular path along an interface between the insulator layers and a plurality of via hole conductors passing through the insulator layers in a thickness direction of the insulator layers, and has a shape that is helically extended by alternately connecting the loop conductor layers and the via hole conductors;

first outer terminal electrode and second outer terminal electrode that are electrically connected to one end and the other end of the coil conductor, respectively; and first extended conductor layer and second extended conductor layer that are formed along an interface between the insulator layers, and connect the one end and the other end of the coil conductor with the first outer terminal electrode and second outer terminal electrode, respectively, wherein the first outer terminal electrode is so provided as to form an exposed surface that extends in an L shape form from a lower half portion of the first end surface to a midway portion of the lower surface in a state where at least part of the first outer terminal electrode is embedded in the component main-body, the second outer terminal electrode is so provided as to form an exposed surface that extends in an L shape form from a lower half portion of the second end surface to a midway portion of the lower surface while leaving a gap from the first outer terminal electrode on the lower surface in a state where at least part of the second outer terminal electrode is embedded in the component main-body, the loop conductor layer includes a lower side portion extending along the lower surface; a first lateral side portion and a second lateral side portion extending along an upper half portion of the first end surface and an upper half portion of the second end surface, respectively; a first oblique side portion connecting an end portion of the lower side portion on the first end surface side and a lower end portion of the first lateral side portion in an oblique direction relative to the lower surface; and a second oblique side portion connecting an end portion of the lower side portion on the second end surface side and a lower end portion of the second lateral side portion in an oblique direction relative to the lower surface, and the lower side portion has a length shorter than the gap and is positioned within a range of the gap, wherein both a length B1 of a perpendicular line drawn from a first nearest portion, that is the nearest portion to the first oblique side portion in an extending section along the lower surface of the first outer terminal electrode, to the outer edge of the first oblique side portion and a length B2 of a perpendicular line drawn from a second nearest portion, that is the nearest portion to the second oblique side portion in an extending section along the lower surface of the second outer terminal electrode, to the outer edge of the second oblique side portion are no less than 10 μm and no more than 50 μm.

5. The lamination inductor according to claim 4, wherein the length B1 and the length B2 are equal to each other.

*6. A lamination inductor comprising:*

*a component main-body that is formed in a rectangular parallelepiped shape including an upper surface and a lower surface opposing each other, first and second side surfaces opposing each other and connecting the upper surface and the lower surface, and first and second end surfaces opposing each other and also connecting the upper surface and the lower surface, and that has a lamination structure in which a plurality of insulator layers are laminated in a direction perpendicular to the side surfaces;*

*a coil conductor that is disposed inside the component main-body, is constituted of a plurality of loop conductor layers each extending so as to form part of a circular path along an interface between the insulator layers and a plurality of via hole conductors passing through the insulator layers in a thickness direction of the insulator layers, and has a shape that is helically extended by alternately connecting the loop conductor layers and the via hole conductors;*

*first outer terminal electrode and second outer terminal electrode that are electrically connected to one end and the other end of the coil conductor, respectively; and*

*first extended conductor layer and second extended conductor layer that are formed along an interface between the insulator layers, and connect the one end and the other end of the coil conductor with the first outer terminal electrode and second outer terminal electrode, respectively,*

*wherein:*

*the first outer terminal electrode is so provided as to form an exposed surface that extends in a substantially L shape form from a lower half portion of the first end surface to a midway portion of the lower surface in a state where at least part of the first outer terminal electrode is embedded in the component main-body,*

*the second outer terminal electrode is so provided as to form an exposed surface that extends in a substantially L shape form from a lower half portion of the second end surface to a midway portion of the lower surface while leaving a gap from the first outer terminal electrode on the lower surface in a state where at least part of the second outer terminal electrode is embedded in the component main-body,*

*the loop conductor layer includes a lower side portion extending along the lower surface; a first lateral side portion and a second lateral side portion extending along an upper half portion of the first end surface and an upper half portion of the second end surface, respectively; a first oblique side portion connecting an end portion of the lower side portion on the first end surface side and a lower end portion of the first lateral side portion in an oblique direction relative to the lower surface; and a second oblique side portion connecting an end portion of the lower side portion on the second end surface side and a lower end portion of the second lateral side portion in an oblique direction relative to the lower surface,*

*the lower side portion has a length shorter than the gap and is positioned within a range of the gap, and*

*both a length A1 of a perpendicular line drawn from a substantially L-shaped internal corner portion of the first outer terminal electrode to an outer edge of the first oblique side portion and a length A2 of a perpendicular line drawn from a substantially L-shaped internal corner portion of the second outer terminal electrode to an outer edge of the second oblique side portion, are equal to or larger than 80 μm.*

*7. The lamination inductor according to claim 6, wherein the length A1 and the length A2 are equal to each other.*

*8. The lamination inductor according to claim 6, wherein the length A1 and the length A2 are equal to 81.6 μm.*

*9. The lamination inductor according to claim 6, wherein the length A1 and the length A2 are between 81.6 μm and 155.2 μm.*

*10. The lamination inductor according to claim 6, wherein a first end of the coil conductor is connected to an uppermost edge of the first outer terminal electrode.*

*11. The lamination inductor according to claim 10, wherein a second end of the coil conductor is connected to an uppermost edge of the second outer terminal electrode.*

*12. The lamination inductor according to claim 1, wherein a first end of the coil conductor is connected to an uppermost edge of the first outer terminal electrode.*

*13. The lamination inductor according to claim 12, wherein a second end of the coil conductor is connected to an uppermost edge of the second outer terminal electrode.*

* * * * *